United States Patent
Chen et al.

(10) Patent No.: US 9,157,765 B2
(45) Date of Patent: Oct. 13, 2015

(54) SELF-POWERED POWER CONSUMPTION DETECTING DEVICE AND POWER CONSUMPTION DETECTING METHOD THEREOF

(75) Inventors: Yi-Ray Chen, Kaohsiung (TW); Ya-Wen Chou, Zhubei (TW); Hsiao-Hsuan Hsu, Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 966 days.

(21) Appl. No.: 13/305,423

(22) Filed: Nov. 28, 2011

(65) Prior Publication Data

US 2012/0143540 A1 Jun. 7, 2012

(30) Foreign Application Priority Data

Dec. 1, 2010 (TW) .............................. 99141798 A

(51) Int. Cl.
 G06F 3/00 (2006.01)
 G06F 1/26 (2006.01)
 (Continued)

(52) U.S. Cl.
 CPC ............ G01D 4/004 (2013.01); *Y02B 70/3266* (2013.01); *Y02B 90/242* (2013.01); *Y02B 90/248* (2013.01); *Y04S 20/242* (2013.01); *Y04S 20/322* (2013.01); *Y04S 20/52* (2013.01)

(58) Field of Classification Search
 CPC .................................................. Y02B 70/325
 USPC .............. 702/19, 28, 62, 179, 188; 340/539.3
 See application file for complete search history.

(56) References Cited

U.S. PATENT DOCUMENTS

| 4,198,859 A | 4/1980 | Holtermann |
| 4,631,655 A | 12/1986 | van Husen |

(Continued)

FOREIGN PATENT DOCUMENTS

| CN | 1304067 A | 7/2001 |
| CN | 1667935 | 9/2005 |

(Continued)

OTHER PUBLICATIONS

English Abstract translation of CN1304067 (Published Jul. 18, 2001).

(Continued)

*Primary Examiner* — Eliseo Ramos Feliciano
*Assistant Examiner* — Felix Suarez
(74) *Attorney, Agent, or Firm* — McClure, Qualey & Rodack, LLP

(57) ABSTRACT

The power consumption detecting device is without external power supply. It installed on the electric equipment. This self-powered detecting device comprises at least one thermoelectric element, a processor and a wireless transmitter. As the electric equipment working, the temperature difference on the surface of the electric equipment drives the thermoelectric element to generate a voltage signal. Therefore, a self-powered thermoelectric detecting device will decrease standby power demand. The amplitude of voltage signal is proportion to the temperature difference. In the same time, the power generated by thermoelectric element can be a power source of the wireless transmitter and the chip or processor, so the supply of exterior power is no needed. The wireless transmitter transmits a signal, which is according to the power consumption of electric equipment or electric appliance, to the control center.

17 Claims, 7 Drawing Sheets

(51) Int. Cl.
*G06F 1/32* (2006.01)
*G06F 3/01* (2006.01)
*G01D 4/00* (2006.01)

(56) References Cited

U.S. PATENT DOCUMENTS

| | | | |
|---|---|---|---|
| 6,339,221 | B1 | 1/2002 | Schubring et al. |
| 6,444,897 | B1 * | 9/2002 | Luque-Lopez et al. ........ 136/255 |
| 6,626,133 | B2 | 9/2003 | Schell et al. |
| 6,747,572 | B2 * | 6/2004 | Bocko et al. ............. 340/870.16 |
| 6,891,478 | B2 | 5/2005 | Gardner |
| 7,466,240 | B2 * | 12/2008 | Evans et al. ............. 340/870.17 |
| 8,618,934 | B2 * | 12/2013 | Belov et al. ................ 340/539.3 |
| 2009/0151765 | A1 | 6/2009 | Han et al. |
| 2009/0240449 | A1 | 9/2009 | Gibala et al. |
| 2010/0250161 | A1 | 9/2010 | Wang et al. |

FOREIGN PATENT DOCUMENTS

| | | |
|---|---|---|
| CN | 1704740 A | 12/2005 |
| CN | 101493358 | 7/2009 |
| CN | 201490940 U | 5/2010 |
| EP | 0636867 B1 | 3/2000 |
| JP | 2010182868 A | 8/2010 |
| TW | 384395 | 3/2000 |
| TW | 564503 | 12/2003 |
| TW | 200415784 | 8/2004 |
| TW | 200518274 | 6/2005 |
| TW | I239642 | 9/2005 |
| TW | 200902945 | 1/2009 |
| TW | M363567 U1 | 8/2009 |
| TW | 200941720 A1 | 10/2009 |

OTHER PUBLICATIONS

English Abstract translation of CN201490940 (Published May 26, 2010).
English Abstract translation of JP2010182868 (Published Aug. 19, 2010).
English Abstract translation of CN1704740 (Published Dec. 7, 2005).
CN Office Action dated May 22, 2013.
TW Office Action dated Jun. 28, 2013.
English Abstract translation of TWM363567U1 (Published Aug. 21, 2009).
English language translation of abstract of TW 384395 (published Mar. 11, 2000).
English language translation of abstract of TW 564503 (published Dec. 1, 2003).
English language translation of abstract of TW 200415784 (published Aug. 16, 2004).
English language translation of abstract of TW 200518274 (published Jun. 1, 2005).
English language translation of abstract of TW I239642 (published Sep. 11, 2005).
English language translation of abstract of CN 1667935 (published Sep. 14, 2005).
English language translation of abstract of CN 101493358 (published Jul. 29, 2009).
Carmo, J.P., et al.; "A Wireless EEG Acquisition System with Thermoelectric Scavenging Microdevice;" pp. 380-383.
Rahul, R., et al.; "Power Management in Wireless Sensor Networks by Enhancing the ThermoElectric Properties of their Circuitries;" International Conference on Advanced Computer Theory and Engineering; 2008; pp. 817-821.
Knight, C., et al.; "Results of a Water Based Thermoelectric Energy Harvesting Device for Powering Wireless Sensor Nodes;" Active and Passive Smart Structures and Integrated Systems; 2009; pp. 1-12.
Ho, et al.; "Techologies for an Autonomous Wireless Home Healthcare System;" Body Sensor Networks; 2009; pp. 29-34.
Knight, C., et al.; "Thermoelectric Energy Harvesting as a Wireless Sensor Node Power Source;" Active and Passive Smart Structures and Integrated Systems; 2010; pp. 1-11.
Nurnus, J.; Thermoelectric Thin Film Power Generators—Self-Sustaining Power Supply for Smart Systems; Smart Sensors, Actuators, and MEMS IV; vol. 7362; pp. 1-6.

* cited by examiner

SELF-POWERED POWER CONSUMPTION DETECTING DEVICE AND POWER CONSUMPTION DETECTING METHOD THEREOF

This application claims the benefit of Taiwan application Serial No. 99141798, filed Dec. 1, 2010, the disclosure of which is incorporated by reference herein in its entirety.

BACKGROUND

1. Technical Field

The disclosed embodiments relate in general to a power consumption detecting device and a power consumption detecting method thereof, and more particularly to a self-powered power consumption detecting device and a power consumption detecting method thereof.

2. Description of the Related Art

The basic unit of power grid ranges from a household, a building, a community to a power grid of the state. The supply and demand of power varied according to the different conditions of environment. Thus, a power plant needs to generate backup power to assure the sufficient power.

However, the backup power, which is normally 16%-20% over actual requirement, is indeed an extra load of the power plant.

SUMMARY

The disclosure is directed to a self-powered power consumption detecting device and a related detecting method. A power consumption value of an equipment is obtained for the control of power supply, so that the power plant generates a corresponding power, and the backup power requires of the power plant is reduced.

According to one embodiment of the disclosure, a power consumption detecting device is provided. The power consumption detecting device comprises a thermoelectric sensing element, a processor and a wireless transmitter. The thermoelectric sensing element generates a voltage signal by the temperature difference between the surface of the electric equipment and atmosphere during the operation of the electric equipment, and the thermoelectric sensing element is powered by the temperature difference without external power supply. The processor used for obtaining the value of power consumption of the electric equipment, and the value of power consumption is proportion to the voltage signal which generated by the thermoelectric detecting device. The wireless transmitter transmitting a power consumption signal to an electric control center.

According to another embodiment of the disclosure, a power consumption detecting method. The power consumption detecting method comprises the following steps. A working power of an electric equipment is detected, wherein a thermoelectric sensing element is driven to output a voltage signal by the temperature difference generated on the surface of the electric equipment when the electric equipment works. A power consumption value of the electric equipment according to the voltage signal is obtained and an electricity consumption signal is accordingly outputted, wherein the electricity consumption signal contains the information of the power consumption value of the electric equipment. A power is used to transmit the electricity consumption signal by a wireless transmitter.

Figure 1:
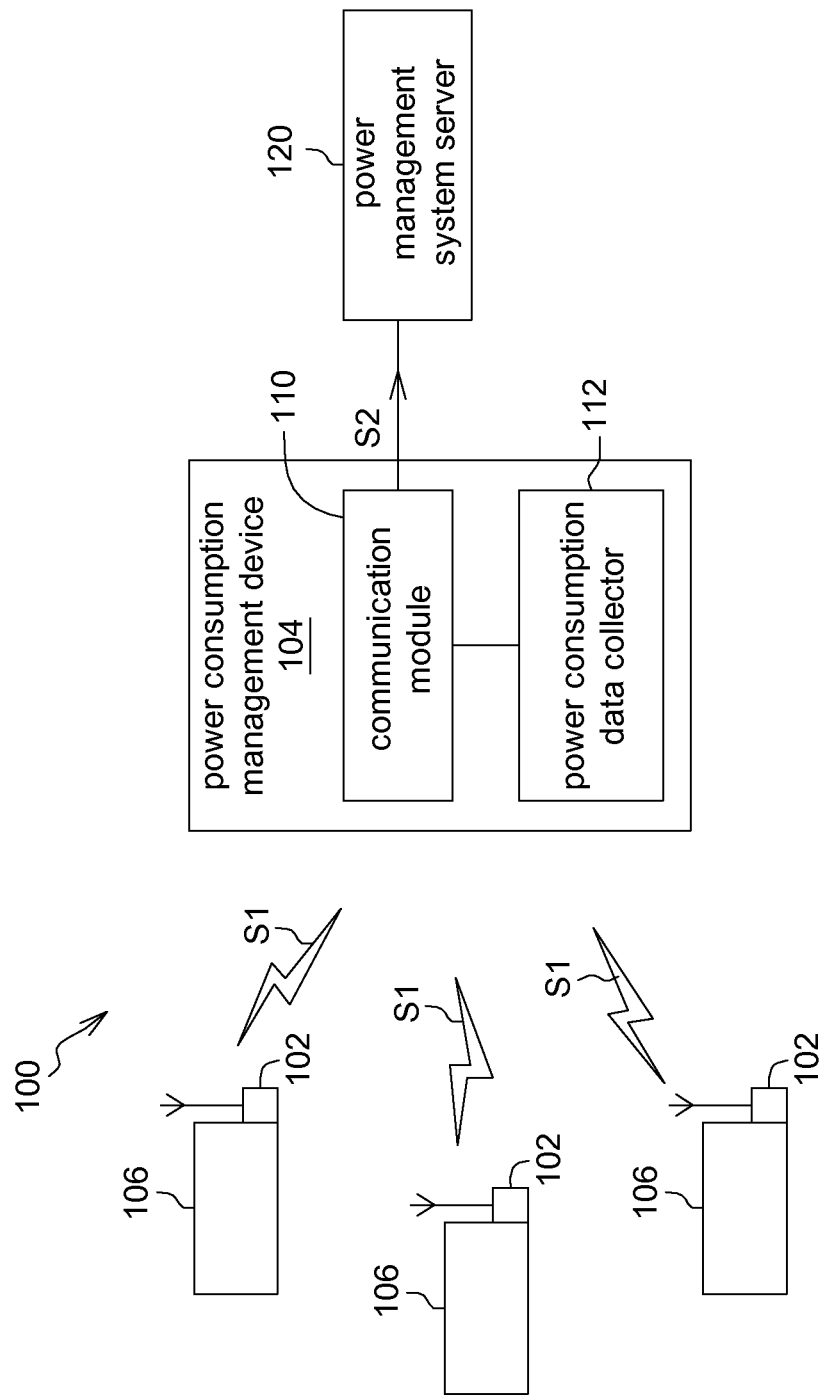
FIG. 1 shows a schematic diagram of an electricity consumption detecting system according to one embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Referring to FIG. 1, a schematic diagram of an electricity consumption detecting system according to one embodiment of the disclosure is shown. The electricity consumption detecting system 100 comprises several power consumption detecting devices 102 and an electricity consumption management device 104. The power consumption detecting devices 102 are respectively installed on different electric equipments 106. The electric equipments 106 are electronic devices powered by a power network, and examples of the electric equipments 106 include computers, home electrical appliances, air-conditioners, fridges, printers and copy machines.

In general, when the electric equipment 106 works, the electric equipment 106 generates heat which causes temperature to rise, and the temperature of the electric equipment 106 is thus higher than the exterior temperature. The direction of temperature drop between the electric equipment 106 and the exterior is directed towards the exterior.

Figure 2:
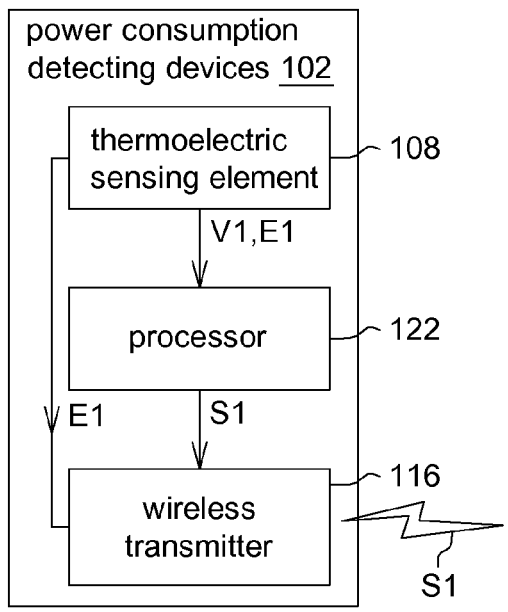
FIG. 2 shows a function block diagram of the electricity consumption detecting power consumption detecting device of FIG. 1.

In the present embodiment of the disclosure, each power consumption detecting device 102 detects a temperature difference caused by a corresponding electric equipment 106, and accordingly generates an electricity consumption signal S1 and a power E1 (illustrated in FIG. 2). The electricity consumption signal S1 indicates the electricity consumption when the electric equipment 106 is in a working state. The power consumption detecting device 102 uses the self-generated power E1 to transmit the electricity consumption signal S1 to the electricity consumption management device 104.

The electricity consumption management device 104, such as a server connected to a local power grid, comprises a communication module 110 and a power consumption data collector 112. After the electricity consumption management device 104 receives the electricity consumption signals S1 transmitted from the power consumption detecting devices 102, the power consumption data collector 112 obtains an aggregate power consumption value by adding up the power consumption values (the electricity consumption of the local power grid) indicated by the electricity consumption signals S1, and the communication module 110 accordingly transmits a power demand signal S2 to the power management system server 120. The power demand signal S2 contains the information of the aggregate power consumption value. The power management system server 120, such as a primary server, summarizes the aggregate power consumption values transmitted from the electricity consumption management devices 104 of all local power grids to perform power monitor. Thus, through the use of the power consumption detecting device 102, the power plant avoid generating excessive backup power, thus the waste of energy is reduced.

In another implementation, the electricity consumption management device 104 or the power management system server 120 may also transmits a power demand signal S2 to a power company, which then controls the power plant to generate a corresponding power.

Referring to FIG. 2, a function block diagram of the electricity consumption detecting power consumption detecting device of FIG. 1 is shown. The power consumption detecting device 102 comprises a thermoelectric sensing element 108, a chip or processor 122 and a wireless transmitter 116, wherein the chip or processor 122 is electrically connected to the thermoelectric sensing element 108 and the wireless transmitter 116. The thermoelectric sensing element 108 is realized by such as a thermoelectric chip. When the electric equipment 106 works, the thermoelectric sensing element 108 is driven to output a voltage signal V1 and a power E1 by the temperature difference generated on the surface of the electric equipment 106. The chip or processor 122 uses the power E1, obtains the power consumption value of the electric equipment 106 according to the voltage signal V1, and accordingly outputs the electricity consumption signal S1, wherein the electricity consumption signal S1 contains the information of the power consumption value of the electric equipment 106. The wireless transmitter 116 uses the power E1 for transmitting the electricity consumption signal S1.

Figure 3:
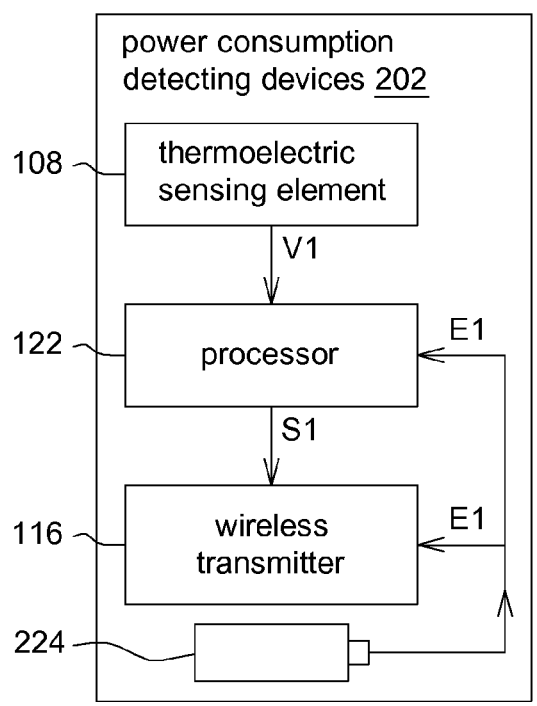
FIG. 3 shows a function block diagram of an electricity consumption detecting power consumption detecting device according to another embodiment of the disclosure.

Referring to FIG. 3, a function block diagram of an electricity consumption detecting power consumption detecting device according to another embodiment of the disclosure is shown. The power consumption detecting device 202 further comprises an interior power supply system 224 for providing the power E1. Furthermore, the thermoelectric sensing element 108 of the power consumption detecting device 202 may be used as a sensor only, and the power E1 needed by the chip or processor 122 and the wireless transmitter 116 is supplied by the interior power supply system 224 such as a battery. In other embodiment, the power E1 may be provided by an exterior power supply system (not illustrated).

The method for obtaining the power consumption value of the electric equipment 106 according to the voltage signal V1 may be implemented in many different ways. For example, the correct power consumption value may be obtained by comparing the data of power consumption values of a database (not illustrated); the power consumption value corresponding to the electricity consumption signal S1 may be obtained through calculation according to a calibration formula or a calibration curve. Wherein, the database, the calibration formula or the calibration curve is stored in the chip or processor 122 of the power consumption detecting device 102.

Figure 4:
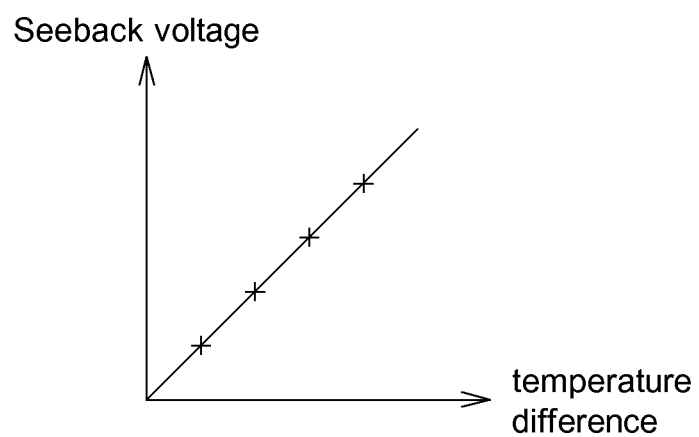
FIG. 4 shows a relationship diagram of the output voltage of thermoelectric sensing element of FIG. 2 vs. the temperature difference generated on the surface of the electric equipment of FIG. 1.

When the electric equipment 106 works in different states, the temperature difference generated on the surface of the electric equipment 106 varies accordingly and drives the thermoelectric sensing element 108 to generate different seeback voltages whose magnitudes are positively proportional to the temperature difference. Referring to FIG. 4, a relationship diagram of the output voltage of thermoelectric sensing element of FIG. 2 vs. the temperature difference generated on the surface of the electric equipment of FIG. 1 is shown.

The thermoelectric sensing element 108 has a simple structure without any mechanical moving parts, and has a long lifetime and does not make noise when in a working state. The thermoelectric sensing element 108 may be manufactured by a thick film method, and may be directly formed on a high thermal conductive substrate. Examples of the thick film method include the electrochemical method, the centrifugal force solidification method, the liquid phase processing method and the Bridgman method. The thermoelectric sensing element 108 may be formed as nanowires so that the density of power output may be increased. The nanowires are directly formed in the base material to reduce contact resistance. The thermoelectric sensing element 108 formed in the form of nanowires may be directly attached on the surface of the electric equipment 106 for recycling the heat of the electric equipment 106 to generate power.

Figure 5:
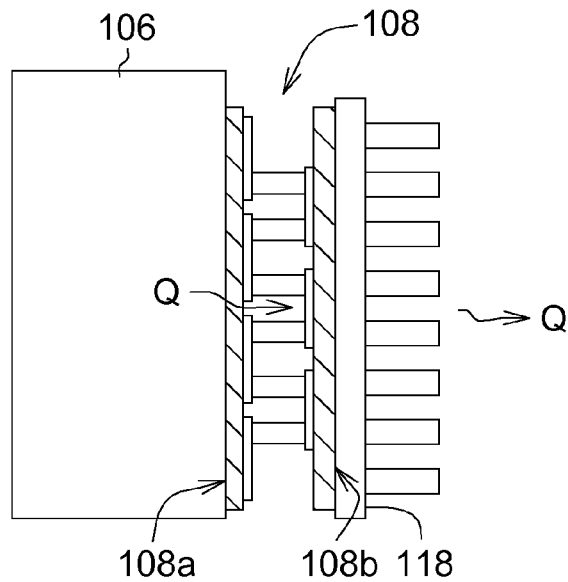
FIG. 5 shows a schematic diagram of the thermoelectric sensing element of FIG. 2 mounted in the electric equipment.
Figure 6:
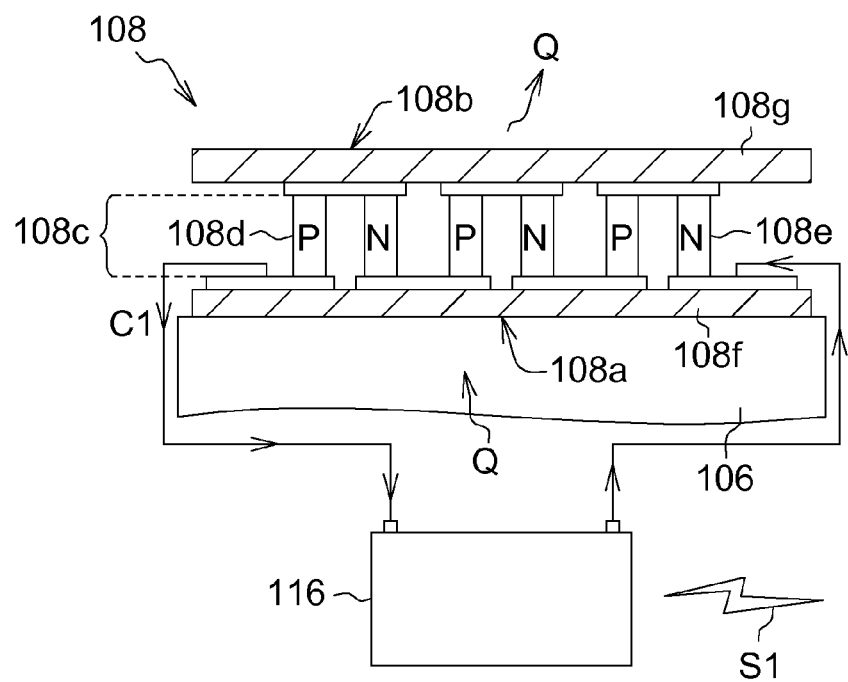
FIG. 6 shows a schematic diagram of electrical connection between thermoelectric sensing element of FIG. 5 and the wireless transmitter.

Referring to FIG. 5 and FIG. 6. FIG. 5 shows a schematic diagram of the thermoelectric sensing element of FIG. 2 mounted in the electric equipment. FIG. 6 shows a schematic diagram of electrical connection between thermoelectric sensing element of FIG. 5 and the wireless transmitter. The thermoelectric sensing element 108, having a first side 108a and a second side 108b opposite to the first side 108a, comprises a semiconductor structure layer 108c, a first insulating thermal conductive plate 108f and a second insulating thermal conductive plate 108g. The semiconductor structure layer 108c is formed by several thermocouples composed of P-type semiconductor materials 108d and N-type semiconductor materials 108e, wherein each thermocouple may generate a current through temperature difference. The semiconductor structure layer 108c, the P-type semiconductor material 108d and the N-type semiconductor material 108e are located between the first insulating thermal conductive plate 108f and the second insulating thermal conductive plate 108g. The first side 108a of the thermoelectric sensing element 108 contacts the electric equipment 106, and the second side 108b of the thermoelectric sensing element 108 faces the exterior.

Besides, the power consumption detecting device 102 further comprises a heat sink 118 installed on the second side 108b of the thermoelectric sensing element 108 for dissipating the heat Q to the exterior so that significant temperature difference is generated between the first side 108a and the second side 108b of the thermoelectric sensing element 108. The larger the temperature difference between the first side 108a and the second side 108b is, the larger the generated voltage will be. In other implementations, the power consumption detecting device 102 may do without the heat sink 118.

As indicated in FIG. 6, when the heat Q generated by the electric equipment 106 causes the temperature of the first side 108a to be higher than the temperature of the second side 108b, a current C1 is generated for connecting the thermoelectric element to the wireless transmitter 116. Thus, the current C1 forms a loop for providing the power to the wireless transmitter 116 to smoothly transmit the electricity consumption signal S1.

Figure 7:
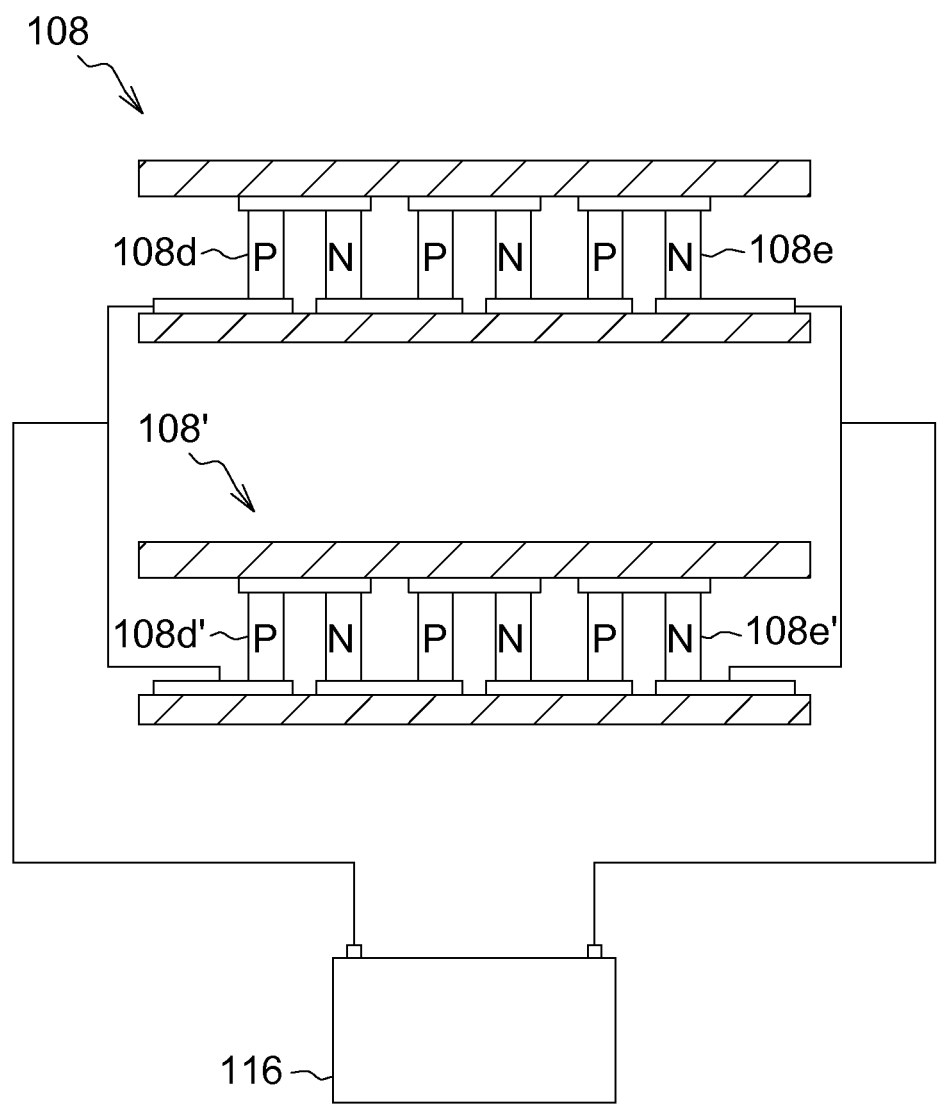
FIG. 7 shows a schematic diagram of several thermoelectric sensing elements connected in parallel according to an implementation of the disclosure.

Moreover, different currents and voltages may be outputted by connecting the thermoelectric sensing elements 108 in serial or parallel to comply with the input request of the wireless transmitter 116. Let parallel connection be taken for example. Referring to FIG. 7, a schematic diagram of several thermoelectric sensing elements connected in parallel according to an implementation of the disclosure is shown. The P-type semiconductor materials 108d of the thermoelectric sensing element 108 are electrically connected to the P-type semiconductor materials 108d' of the thermoelectric sensing element 108', and the N-type semiconductor materials 108e of the thermoelectric sensing element 108 are electrically connected to the N-type semiconductor materials 108e' of the thermoelectric sensing element 108' to form a parallel-connection structure capable of outputting a larger current.

Figure 8:
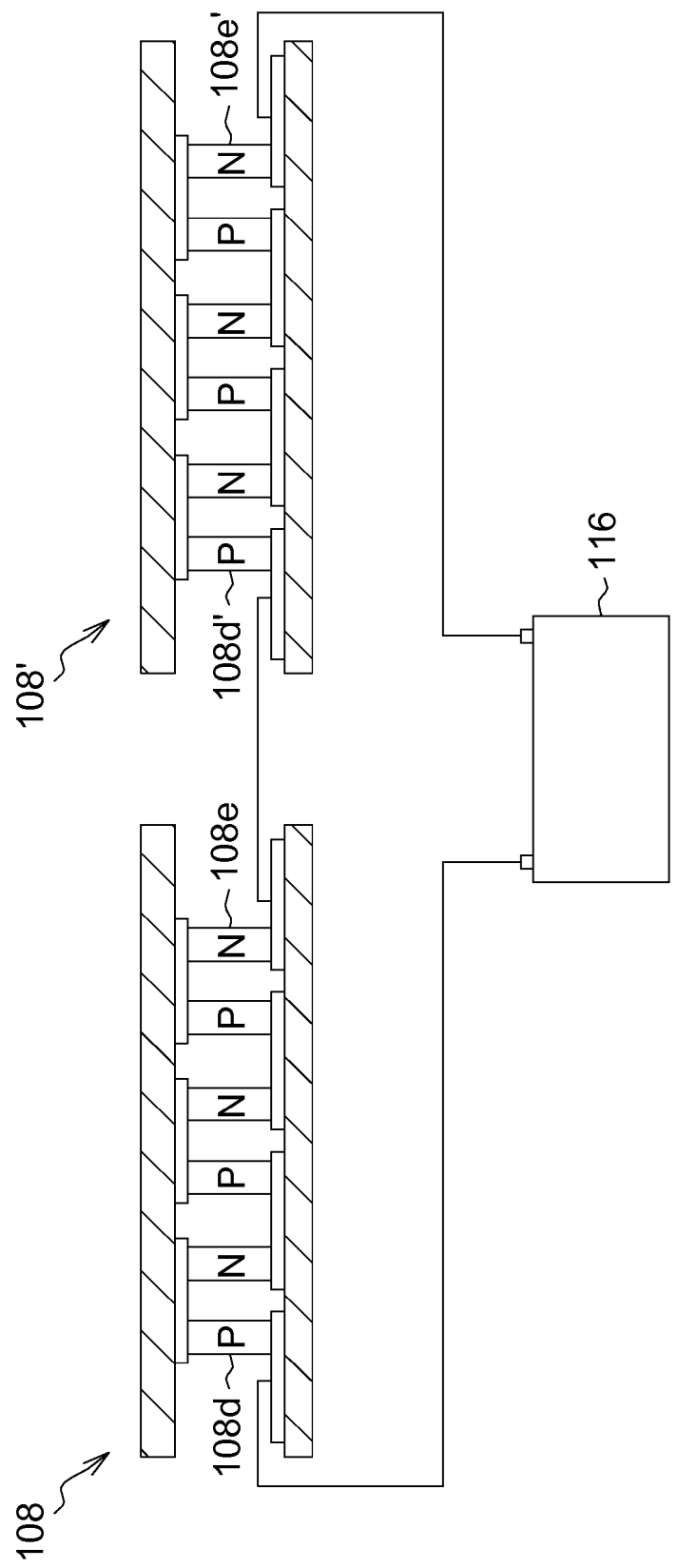
FIG. 8 shows a schematic diagram of several thermoelectric sensing elements connected in serial according to another implementation of the disclosure.

Referring to FIG. 8, a schematic diagram of several thermoelectric sensing elements connected in serial according to another implementation of the disclosure is shown. The N-type semiconductor materials 108e of the thermoelectric sensing element 108 are electrically connected to the P-type semiconductor materials 108d' of the thermoelectric sensing element 108' to form a serial-connection structure capable of outputting a larger voltage.

Preferably but not restrictively, the thermoelectric sensing element 108 outputs at least 20 milli-watts per square cm ($mW/cm^2$) in an environment with 5° C. of temperature difference, wherein the area is the surface of the thermoelectric sensing element 108 contacting the electric equipment, and is the area of the first side 108a of the thermoelectric sensing element 108 in the present embodiment of the disclosure. Expected power output may be achieved through the selection of various types or functions of thermoelectric sensing elements 108. For example, the larger the thermoelectric conversion coefficient of the thermoelectric sensing element 108 is or the thinner the thermoelectric sensing element 108 is, the larger the power output of the thermoelectric sensing element 108 will be. Preferably but not restrictively, the thickness of the thermoelectric sensing element 108 ranges between 0.35~0.75 mm. Or, the power output of the thermoelectric sensing element 108 may be increased by way of connecting several thermoelectric sensing elements 108 in serial or in parallel.

Figure 9:
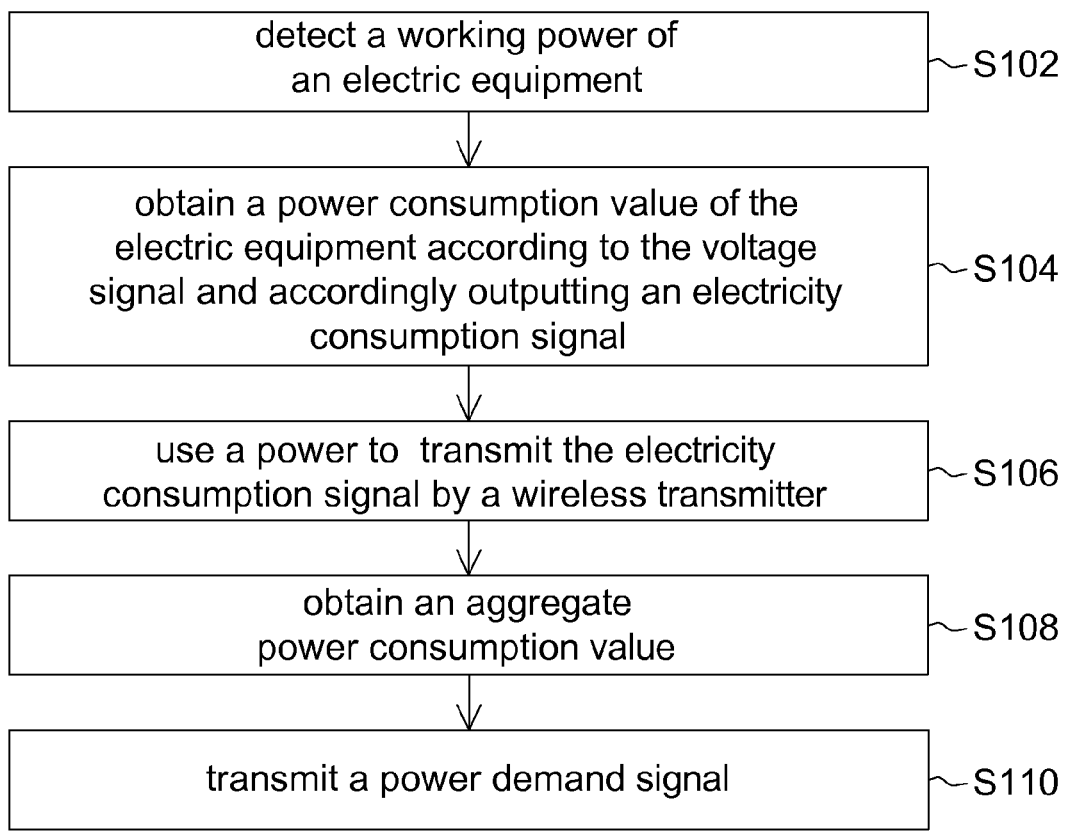
FIG. 9 shows a flowchart of a power consumption detecting method according to one embodiment of the disclosure.

Referring to FIG. 9 and FIGS. 1~2. FIG. 9 shows a flowchart of a power consumption detecting method according to one embodiment of the disclosure.

Firstly, the method begins at step S102, a working power of the electric equipment 106 is detected, wherein when the electric equipment 106 works, thermoelectric sensing element 108 is driven to output a voltage signal V1 and a power E1 by the temperature difference generated on the surface of the electric equipment 106.

Next, the method proceeds to step S104, a power consumption value of the electric equipment 106 is obtained by the chip or processor 122 according to the voltage signal V1 and the electricity consumption signal S1 is outputted by the chip or processor accordingly, wherein the electricity consumption signal S1 contains the information of the power consumption value of the electric equipment 106.

Then, the method proceeds to step S106, an electricity consumption signal S1 is continually transmitted by the wireless transmitter 116 using the power E1.

Since temperature difference occurs continuously, the thermoelectric sensing element 108 continually outputs the power E1 and the electricity consumption signal S1 to the wireless transmitter 116, which is powered by the power W1 to continually transmit the electricity consumption signal S1 (step S106). When the electricity consumption management device 104 does not receive the electricity consumption signal S1, this indicates that the electric equipment 106 is not in a working state (no power consumption occurs). Furthermore, no heat will be generated when the electric equipment 106 is not working. Therefore, the thermoelectric sensing element 108 and the power consumption detecting device 102 in step S104 are in a suspending state. Since there is no need to provide stand-by power to the power consumption detecting device, the power supply of the power consumption detecting device 102 may thus be reduced.

Then, the method proceeds to step S108, an aggregate power consumption value is obtained by adding up the power consumption values indicated by the received electricity consumption signals S1 by the power consumption data collector 112 of the electricity consumption management device 104 by.

Then, the method proceeds to step S110, a power demand signal S2 is transmitted to the power company or the power management system server 120 by the communication module 110 of the electricity consumption management device 104, wherein, the power demand signal S2 contains the information of the aggregate power consumption value.

Afterwards, the power management system server 120 performs power monitor after receiving the power demand signals S2 transmitted from the electricity consumption management devices 104, wherein, the electricity consumption management devices 104 may be connected to a single or multiple local power grids, and the power management system server 120 may be connected to the interior or the exterior of the power company.

According to the power consumption detecting device, the electricity consumption management device, the electricity consumption detecting system and the related detecting method disclosed in the above embodiments of the disclosure, the power plant generates a power corresponding a power consumption value of the electric equipment so that the burden of the power plant is alleviated. Since the power consumption detecting device is self-powered, no exterior power is needed.

It will be apparent to those skilled in the art that various modifications and variations may be made to the disclosed embodiments. It is intended that the specification and examples be considered as exemplary only, with a true scope of the disclosure being indicated by the following claims and their equivalents.

What is claimed is:

1. A power consumption detecting device installed on an electric equipment, wherein the power consumption detecting device comprises:
   a thermoelectric sensing element used for generating a voltage signal by the temperature difference between the surface of the electric equipment and atmosphere during the operation of the electric equipment, and the thermoelectric sensing element is capable of generating power by the temperature difference without external power supply;
   a processor used for obtaining the value of power consumption of the electric equipment according to the voltage signal, and the value of power consumption is proportion to the voltage signal which generated by the thermoelectric detecting device; and
   a wireless transmitter transmitting a power consumption signal to an electric control center;
   wherein the thermoelectric sensing element is embodied as a device directly attached on the surface of the electric equipment, and the thermoelectric sensing element has a P-type semiconductor material and an N-type semiconductor material which are electrically connected to the wireless transmitter.

2. The power consumption detecting device according to claim 1, wherein the thermoelectric sensing element has a first side and a second side opposite to the first side, and one side of the first side and the second side contacts the electric equipment.

3. The power consumption detecting device according to claim 2, further comprising:
a heat sink installed on the other one of the first side and the second side.

4. The power consumption detecting device according to claim 1, comprising a plurality of the thermoelectric sensing elements connected in parallel.

5. The power consumption detecting device according to claim 1, comprising a plurality of the thermoelectric sensing elements connected in serial.

6. The electricity consumption detecting device according to claim 1, wherein an exterior power supply system provides the wireless transmitter with a power to transmit the power consumption signal.

7. The electricity consumption detecting device according to claim 1, further comprising:
an interior power supply system for providing the wireless transmitter with a power to transmit the power consumption signal.

8. The power consumption detecting device according to claim 1, wherein the thermoelectric sensing element is driven to output the voltage signal by the temperature difference generated on the surface of the electric equipment during the operation of the electric equipment.

9. The power consumption detecting device according to claim 1, wherein an power consumption management device receives the power consumption signal, the power consumption management device comprises a communication module and an power consumption data collector, and after the power consumption management device receives a plurality of the power consumption signals, the power consumption data collector obtains an aggregate electricity consumption value by adding up a plurality of the electricity consumption values indicated by the electricity consumption signals, and the communication module transmits a power demand signal, which contains the information of the aggregate electricity consumption value.

10. The electricity consumption detecting device according to claim 9, wherein a power management system server summarizes a plurality of the power demand signals transferred from a plurality of the electricity consumption management devices to perform power monitoring.

11. A power consumption detecting method, comprising:
detecting a working power of an electric equipment, wherein a thermoelectric sensing element generates a voltage signal by the temperature difference generated on the surface of the electric equipment when the electric equipment works;
obtaining a power consumption value of the electric equipment according to the voltage signal and accordingly outputting an electricity consumption signal, wherein the electricity consumption signal contains the information of the power consumption value of the electric equipment; and
using a power to transmit the electricity consumption signal by a wireless transmitter;
wherein the thermoelectric sensing element is embodied as a device directly attached on the surface of the electric equipment, and the thermoelectric sensing element has a P-type semiconductor material and an N-type semiconductor material which are electrically connected to the wireless transmitter.

12. The power consumption detecting method according to claim 11, further comprising:
providing the power by an exterior power supply system.

13. The power consumption detecting method according to claim 11, further comprising:
providing the power by an interior power supply system.

14. The power consumption detecting method according to claim 11, wherein in the step of detecting the working power of the power consumption element, the thermoelectric sensing element is driven to output the power by the temperature difference generated on the surface of the electric equipment when the electric equipment works.

15. The power consumption detecting method according to claim 11, further comprising:
obtaining an aggregate power consumption value by adding up the power consumption values indicated by a plurality of the received power consumption signals; and
transmitting a power demand signal, which contains the information of the aggregate power consumption value.

16. The power consumption detecting method according to claim 15, wherein an power consumption management device receives the power consumption signals, the power consumption management device comprises a communication module and an power consumption data collector, and after the power consumption management device receives the power consumption signals, the power consumption data collector obtains an aggregate power consumption value by adding up the power consumption values indicated by the power consumption signals, and the communication module transmits the power demand signal.

17. The power consumption detecting method according to claim 16, further comprising:
receiving a plurality of the power demand signals transmitted from a plurality of the power consumption management devices to perform power monitoring.

* * * * *